United States Patent

Braun et al.

[11] Patent Number: 5,589,272
[45] Date of Patent: Dec. 31, 1996

[54] GLAZING

[75] Inventors: Rüdiger Braun, Friedrichshafen; Manfred Arnold, Meckenbeuren; Thomas Meisel; Werner Scherber, both of Bermatingen; Günther Abersfelder, Sindelfingen; Stefan Uhl, Stuttgart, all of Germany

[73] Assignee: Dornier GmbH, Friedrichshafen, Germany

[21] Appl. No.: 394,350

[22] Filed: Feb. 27, 1995

[30] Foreign Application Priority Data

Feb. 25, 1994 [DE] Germany .................. 44 06 097.1

[51] Int. Cl.⁶ .................... B32B 17/06; B32B 17/10; B32B 27/36
[52] U.S. Cl. .................... 428/425.6; 428/412; 428/426; 428/441; 428/424.4; 428/430
[58] Field of Search .................... 428/425.6, 412, 428/426, 441, 424.4, 430

[56] References Cited

U.S. PATENT DOCUMENTS

| | | | |
|---|---|---|---|
| 3,089,801 | 5/1963 | Tierney et al. | 154/47 |
| 3,923,757 | 12/1975 | Sayler et al. | 260/80.75 |
| 4,596,622 | 6/1986 | Heenan et al. | 156/275.5 |
| 4,600,640 | 7/1986 | Olson | 428/332 |
| 4,861,666 | 8/1989 | LeGrand et al. | 428/412 |
| 4,879,183 | 11/1989 | Mannheim | 428/437 |
| 5,002,326 | 3/1991 | Westfield et al. | 296/95.1 |
| 5,318,853 | 7/1994 | Bayha et al. | 428/431 |
| 5,445,890 | 8/1995 | Bayha et al. | 428/431 |

FOREIGN PATENT DOCUMENTS

| | | |
|---|---|---|
| 2354296 | 6/1978 | France . |
| 1184042 | 2/1967 | United Kingdom . |

*Primary Examiner*—W. Robinson H. Clark
*Attorney, Agent, or Firm*—Evenson, McKeown, Edwards & Lenahan

[57] ABSTRACT

A transparent glass/plastic material composite pane, comprising at least one transparent plastic pane, at least one glass pane and according to demand an adhesion-promoting intermediate layer between the glass pane and the plastic pane, the glass pane being a glass film of a layer thickness of from 30 to 1,000 µm.

15 Claims, 1 Drawing Sheet

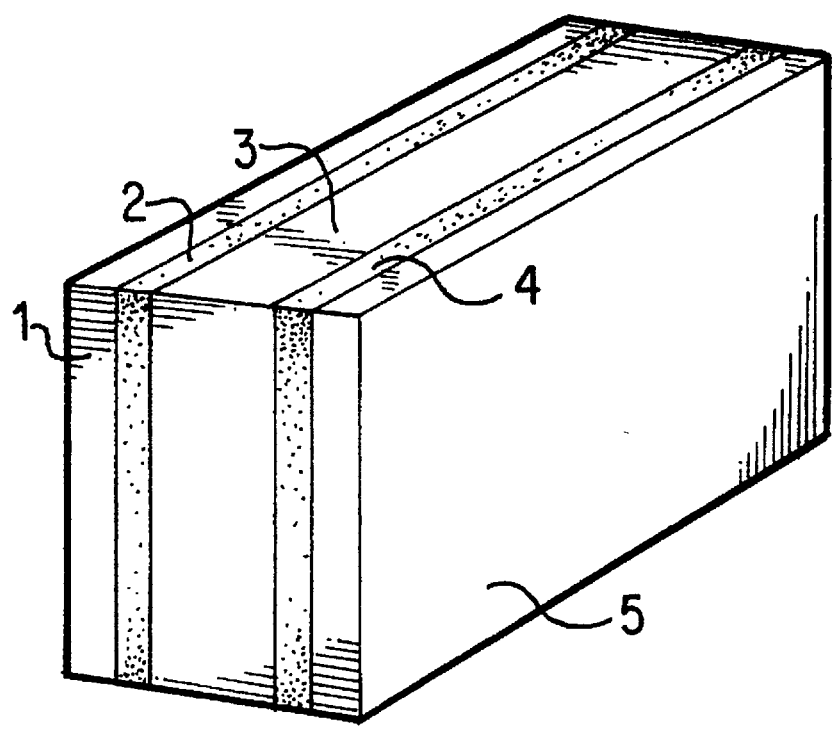

GLAZING

BACKGROUND OF THE INVENTION

This invention relates to a light scratch-resistant glazing. Glazing is increasingly becoming a limiting factor with respective of the requirement to reduce weight, particularly in the case of vehicles. When conventional glass is used, weight reduction is impossible because the concomitant reduction of the pane thickness cannot be carried out without diminishing the safety of the vehicle occupants. A solution can therefore be expected only as the result of the use of different materials, particularly transparent plastic materials, such as polycarbonate (PC) or polymethylmethacrylate (PMMA). These materials have a high strength and impact resistance and in comparison to glass, they have only approximately 50% of the density and therefore a considerable advantage with respect to their weight. However, plastic materials are not used particularly because of their low resistance with respect to scratches, abrasion, chemicals (cleaning agents) and UV radiation as well as their easy flammability and combustibility.

There have been a number of attempts to eliminate disadvantages of plastic materials by means of transparent thin hard coatings with $SiO_2$, $TiO_2$, etc. These layers are applied by vacuum-evaporation processes, sputtering processes, chemical vapor deposition (CVD) processes or sol-gel processes. Since the resulting protective films are very thin (<10 μm), the demands for scratch resistance and particularly for notched impact strength have not been met.

SUMMARY OF THE INVENTION

It is, therefore, an object of the invention to provide a glazing which, on the one hand, meets today's high requirements with respect to notched impact strength, scratch resistance, abrasion resistance, resistance to chemicals and resistance to environmental influences and which, at the same time, without impairing the safety of the vehicle occupants, is considerably lighter than conventional vehicle glazings.

The solution comprises a composite of a plastic pane and at least one scratch-resistant, abrasion-resistant glass film which is resistant to chemicals and environmental influences and does not significantly contribute to the overall weight of the system. An adhesion-promoting intermediate layer is arranged between the transparent plastic pane and the glass film. According to the invention, the thickness of the glass film is between about 30 and about 1,000 μm, particularly between about 300 and about 700 μm and, in further advantageous embodiments, between about 300 and about 500 μm. Glass films of this type are commercially available. In addition, by means of the outer glass film, an effective fire protection is achieved because the glass film/plastic composite constructed in this manner is neither easily inflammable nor easily combustible. Such a fire resistance by an outer glass film can also be applied to various other plastic materials like PMMA (polymethylmethacrylate), etc.

The transparent plastic pane is preferably made of polycarbonate, copolycarbonate, polyester carbonate, copolyester carbonate, poly(meth) acrylate or polymethyl(meth) acrylate as the plastic material. By "(meth)acrylate" is meant acrylate or methacrylate. In advantageous constructions, it has a thickness of at least about 1 mm; in preferred embodiments, a thickness of more than about 3 mm to 5 mm.

The adhesion-promoting intermediate layer preferably consists of a transparent adhesive bonding agent, particularly a transparent resin such as polyurethane, acrylate, methacrylate adhesives, mixtures of acrylate and methacrylate adhesives, epoxy resins, and silicones, or a transparent adhesive film such as a polyurethane adhesive film, a polyvinyl butyral adhesive film, or an acrylate adhesive film.

Because of the construction of the glass/plastic material composite, functional coatings, such as electrically conductive layers for de-icing, thermal insulation layers (see, e.g., EPO 0 464 701 A2), and electrochromic systems (see, e.g., DE 36 43 690 C2), may additionally be applied to the interior side of the glass film between the glass and the plastic pane and are effectively protected against outside influences. The possibility of applying these coatings to the glass film offers additional process-technical advantages in comparison to an application to plastic materials. For example, thermal stress is much less critical for the glass film than for the plastic plates. Thus, by applying conventional coating techniques (vacuum-evaporation, sputtering, CVD, sol-gel, and the like) in combination with high substrate temperatures, better adhering coatings can be achieved. Because of the lower thermal expansion in comparison to the polymer, coatings which are free of cracks can also be produced more easily on glass. Furthermore, in the case of thin glass films, a "continuous coating" of the glass films can advantageously be carried out in roll coaters, which results in considerable advantages with respect to the cost in comparison to the individual coating of fabricated parts.

For producing biaxially curved glass types, thermal deformation of the glass films to the final form is advantageously used, for example, by deep drawing or conventional glass bending methods.

In an advantageous construction of the invention, the plane or bent glass film is prestressed before the combining of the individual components of the glass/plastic material composite. Chemical processes, for example, chemical hardening, are particularly suitable for generating the prestress. The glass film to be hardened is entered into a hot potassium salt solution. In the case of a sodium-containing glass film, the Na-ions in the glass film are replaced by the larger K-ions of the salt solution. This process takes place on the surface of the glass film to a penetration depth of $\leq 100$ μm. A compressive strain therefore occurs on the surface of the glass film.

According to the invention, various embodiments of the glass/plastic material composite are possible:

—Preformed plastic pane is glued together with the preformed glass films by means of adhesive resin or a transparent adhesive film.

—The plastic is inserted as a liquid monomeric solution (resin) between the glass films and is then polymerized to form the finished composite.

—The plastic material is applied as a molten polymer on or between the glass panes.

In addition, it is possible to optimize the adhesion between the glass and the polymer by means of commercially available adhesion promoters which are well-known in the art. It is also advantageous to absorb the mechanical stress occurring because of the different thermal expansion of the materials by means of elastic intermediate layers or adhesive layers.

The possibility of using plastic glass types also opens up new design possibilities. Thus, for example, in the motor vehicle field, very curved side windows can be implemented without the requirement of increasing the thickness of the door for this purpose in order to create space for the entering of the rigid bent glass pane. The elasticity of the plastic composite glass types permits a bending of the pane during the opening or closing of the window and therefore accommodating it in a space-saving manner in the door as a straight pane.

BRIEF DESCRIPTION OF THE DRAWING

The invention will be explained in detail in the following detailed description which makes reference to the accompanying drawing wherein:

The sole FIGURE shows a glazing according to the invention which is constructed in several layers.

DETAILED DESCRIPTION OF THE PREFERRED EMBODIMENTS

EXAMPLE 1

A transparent adhesive polyurethane film 2, 4 was applied to a polycarbonate pane 3. For example, the polyurethane film was laminated onto the PC pane by means of rollers. The glass films 1, 5 were also applied to this layered stack by laminating. The transparent adhesive polyurethane film could be, for instance, that of SierraCine Co. having thickness: 0.38 mm or 0.60 mm, or an adhesive film laminated at room temperature on an acrylate substrate, such as Isotac 4910 by 3M Company, to a thickness of 1 mm. The adhesive polyurethane film was typically applied at a temperature of about 120° C. at a pressure of about 20 bar.

EXAMPLE 2

A glass film was successively applied to both sides of a polycarbonate pane by means of a transparent liquid adhesive agent. The adhesive agent was a polyurethane resin produced from the constituent polyol (for example, from Bayer Co., Baytec PU 315) and an isocyanate (for example, from Bayer Co., Desmodur PU 316) Typical ratio: polyol/isocyanate=5:1.

Example 3

A composite was made of two glass films, which are sealed off at the edge, for example, by means of butyl rubber, a transparent adhesive film such as Isotac 4910 of the 3M Company, or similar media, the space was filled completely by a solution of a monomer (such as methacrylic acid) and a photoinitiator such as IRGACURE 184 of Ciba Geigy Co. (approximately 1–5%). By exposing the pane to an ultraviolet lamp, the solution was polymerized in a conventional manner. This results in a glass film—PMMA composite.

EXAMPLE 4

Deviating from Example 3, when a solution of a monomer and a thermal initiator (such as 2% of azobisisobutyronitrile) is used, the polymerization can be triggered by increasing the temperature to approximately 60° C., and a composite can be produced in this manner.

EXAMPLE 5

Adhesion promoters (such as 3-methacryloxypropyl trimethoxysilane, 0.1 to 10%), which improve the adhesion between the glass and the polymer, may be added to the solutions used in Examples 3 and 4. Their effect can still be reinforced by an additional activation of the glass surfaces or plastic surfaces, such as chemical activation, plasma treatment or corona treatment, etc.

EXAMPLE 6

A polycarbonate melt was applied to a glass film and a second glass film is laminated onto it while the first glass film is still in the liquid condition. After cooling of the pane, a firm PC/glass composite was obtained.

The invention is used in the glazing of vehicles, rail vehicles, airplanes, ships and buildings or light bullet-proof glass. It may also be used as a light scratch-resistant and abrasion resistant headlight cover.

We claim:

1. A transparent glass/plastic material composite pane, comprising at least one transparent plastic pane, at least one glass pane and an adhesion-promoting intermediate layer between the glass pane and the plastic pane, wherein the glass pane is a glass film of a layer thickness of from 300 to 700 µm, and the adhesion-promoting intermediate layer is elastic to thereby equalize different thermal expansions of the plastic pane and the glass pane.

2. A composite pane according to claim 1, wherein the glass film is prestressed.

3. A composite pane according to claim 2, wherein the prestressing of the glass film is generated by chemical hardening.

4. A composite pane according to claim 1, wherein the plastic pane has a thickness of at least 1 mm.

5. A composite pane according to claim 1, wherein the adhesion promoting intermediate layer is a transparent adhesive comprising an adhesive resin, or a transparent adhesive film.

6. A composite pane according to claim 1, comprising at least one layer sequence of a glass film, an adhesion-promoting intermediate layer, a plastic pane, a second adhesion-promoting intermediate layer and a second glass film.

7. A composite pane according to claim 1, wherein the transparent plastic pane is a polycarbonate, copolycarbonate, polyester carbonate, copolyester carbonate, poly(meth)acrylate or polymethyl(meth)acrylate plastic material.

8. A composite pane according to claim 1, wherein the plastic pane is a thermoplastic polymer.

9. A composite pane according to claim 1, wherein the plastic pane is produced by direct polymerization of a plastic resin between two adjoining glass films, the interior surfaces of the glass films being provided with an adhesion-promoting layer.

10. A composite pane according to claim 1, further comprising at least one functional coating.

11. A composite pane according to claim 10, wherein said functional coating is at least one of an electrically conductive layer, a thermal insulation layer and an electrochromic system.

12. A composite pane according to claim 1, having a curved surface.

13. A composite pane according to claim 6, further comprising at least one functional coating.

14. A composite pane according to claim 13, wherein said functional coating is at least one of an electrically conductive layer, a thermal insulation layer and an electrochromic system.

15. A composite pane according to claim 6, having a curved surface.

* * * * *